United States Patent
Dousse

(10) Patent No.: US 9,313,617 B2
(45) Date of Patent: Apr. 12, 2016

(54) IDENTIFICATION OF POINTS OF INTEREST AND POSITIONING BASED ON POINTS OF INTEREST

(75) Inventor: Olivier Dousse, Berlin (DE)

(73) Assignee: Nokia Technologies Oy, Espoo (FI)

( * ) Notice: Subject to any disclaimer, the term of this patent is extended or adjusted under 35 U.S.C. 154(b) by 272 days.

(21) Appl. No.: 13/994,899

(22) PCT Filed: Dec. 17, 2010

(86) PCT No.: PCT/IB2010/055907
§ 371 (c)(1),
(2), (4) Date: Sep. 13, 2013

(87) PCT Pub. No.: WO2012/080787
PCT Pub. Date: Jun. 21, 2012

(65) Prior Publication Data
US 2013/0344888 A1    Dec. 26, 2013

(51) Int. Cl.
*H04W 24/00* (2009.01)
*H04W 4/02* (2009.01)

(52) U.S. Cl.
CPC .............. *H04W 4/025* (2013.01); *H04W 4/022* (2013.01)

(58) Field of Classification Search
CPC ............................ H04W 4/025; H04W 4/022
USPC .............................. 455/456.1–456.3; 370/338
See application file for complete search history.

(56) References Cited

U.S. PATENT DOCUMENTS

| | | | |
|---|---|---|---|
| 6,240,360 B1 * | 5/2001 | Phelan .......................... | 701/438 |
| 2008/0189321 A1 * | 8/2008 | Alles et al. .................... | 707/102 |
| 2009/0315995 A1 | 12/2009 | Khosravy et al. | |
| 2009/0319166 A1 | 12/2009 | Khosravy et al. | |

FOREIGN PATENT DOCUMENTS

| | | |
|---|---|---|
| EP | 2 246 666 A1 | 11/2010 |
| WO | WO-2007/031962 A2 | 3/2007 |
| WO | WO-2010/126412 A1 | 11/2010 |

OTHER PUBLICATIONS

Ankerst, M., et al.; "*OPTICS: Ordering Points to Identify the Clustering Structure*;" SIGMOD; dated Jun. 199; pp. 49-60; retrieved on Sep. 13, 2013 from <http://www.cs.uiuc.edu/class/fa05/cs591han/papers/ankerst99.pdf>.

(Continued)

*Primary Examiner* — Marcos Batista
(74) *Attorney, Agent, or Firm* — Alston & Bird LLP

(57) ABSTRACT

It is inter alia disclosed methods, apparatuses, systems, computer programs and computer-readable mediums for identifying a point of interest, for providing a point of interest, and for receiving a point of interest. According to one aspect of the invention, a respective position-related information collected by at least one device at a plurality of time points is obtained. One or more of the collected position-related information is represented as respective position-related points in a one- or multidimensional space. At least one point of interest is identified by detecting at least one accumulation zone from the position-related points in the space.

20 Claims, 8 Drawing Sheets

(56) References Cited

OTHER PUBLICATIONS

Ester, M., et al.; "*A Density-Based Algorithm for Discovering Clusters in Large Spatial Databases with Noise*;" Proceedings of 2nd International Conference on Knowledge Discovery and Data Mining (KDD-96); dated 1996; retrieved on Sep. 13, 2013 from <http://dns2.icar.cnr.it/manco/Teaching/2005/datamining/articoli/KDD-96.final.frame.pdf>.

International Search Report and Written Opinion for Application No. PCT/IB2010/055907; dated Sep. 8, 2011.

\* cited by examiner

IDENTIFICATION OF POINTS OF INTEREST AND POSITIONING BASED ON POINTS OF INTEREST

FIELD

This invention relates to collecting and processing position-related information for identifying, providing and/or receiving points of interest.

BACKGROUND

Currently, mobile devices can be used for detecting the actual physical position of a user of the mobile devices, for instance based on satellite-based positioning.

SUMMARY OF SOME EMBODIMENTS OF THE INVENTION

Applications of the mobile device may provide the user with significant locations, also called points of interest (POIs), which are more meaningful for the user than physical coordinates, such as longitude, latitude and altitude coordinates.

A mobile device may sense radio signals which can be converted into physical coordinates. However, such a conversion involves large precision losses. Furthermore, the determined coordinates may not be directly used by applications but converted into POIs. Hence, sensing and converting radio signals into physical coordinates may be an unnecessary intermediate step.

POIs may be automatically identified. For instance, a method may be based on satellite-based positioning (such as Global Positioning System (GPS)) only, or rely on a preliminary conversion of radio measurement into geographical coordinates.

Also Wireless Local Area Network (WLAN) signals may be used only, and POIs may be detected based on the presence or absence of certain access points. Hence, hard thresholds may be used which may however not map the real world.

According to a first aspect of the present invention, a method is disclosed, performed by an apparatus, comprising obtaining respective position-related information collected by at least one device at a plurality of time points; representing one or more of the collected position-related information as respective position-related points in a one- or multidimensional space; and identifying at least one point of interest by detecting at least one accumulation zone from the position-related points in the space.

According to the first aspect of the present invention, further a computer program is disclosed, comprising program code for performing the method according to the first aspect of the present invention and all exemplary embodiments thereof when the computer program is executed on a processor.

According to the first aspect of the present invention, further a readable medium is disclosed, having a program according to the method of the first aspect of the present invention stored thereon. The readable storage medium may for instance be a computer-readable or processor-readable storage medium. It may be embodied as an electric, magnetic, electromagnetic, optic or other storage medium, and may either be a removable storage medium or a storage medium that is fixedly installed in an apparatus or device.

According to the first aspect of the present invention, further a first apparatus is disclosed, configured to perform the method according to the first aspect of the present invention.

According to the first aspect of the present invention, further a second apparatus is disclosed, comprising at least one processor, and at least one memory including computer program code, the at least one memory and the computer program code configured to, with the at least one processor, cause the apparatus at least to obtain respective position-related information collected by at least one device at a plurality of time points; represent one or more of the collected position-related information as respective position-related points in a one- or multidimensional space; and identify at least one point of interest by detecting at least one accumulation zone from the position-related points in the space.

According to the first aspect of the present invention, further a third apparatus is disclosed, comprising means for obtaining respective position-related information collected by at least one device at a plurality of time points; means for representing one or more of the collected position-related information as respective position-related points in a one- or multidimensional space; and means for identifying at least one point of interest by detecting at least one accumulation zone from the position-related points in the space.

The first apparatus, the second apparatus or the third apparatus according to the first aspect of the present invention may for instance be the device which collects the position-related information or a part thereof. Alternatively, the first apparatus, the second apparatus or the third apparatus may for instance be a server that is configured to obtain the position-related information from the device or a part thereof.

The first apparatus, the second apparatus or the third apparatus according to the first aspect of the present invention may further comprise a user interface. For instance, the apparatus may be a mobile phone. The mobile phone may comprise user interface circuitry and user interface software configured to facilitate user control of at least some functions of the mobile phone through use of a display and configured to respond to user inputs and a display circuitry configured to display at least a portion of a user interface of the mobile phone, the display and display circuitry configured to facilitate user control of at least some functions of the mobile phone.

According to the first aspect of the present invention, further a system is disclosed, comprising a device configured to collect respective position-related information and a server comprising the first, second or third apparatus according to the first aspect of the present invention. The device is configured to transmit the position-related information to the server.

According to a second aspect of the present invention, a method is disclosed, performed by an apparatus, comprising checking whether a position-related point representing, in a one- or multidimensional space, a position-related information collected by a device is comprised in at least one accumulation zone corresponding to a point of interest stored in a database; and only if the checking yields a positive result, providing the point of interest corresponding to the accumulation zone.

According to the second aspect of the present invention, further a computer program is disclosed, comprising program code for performing the method according to the second aspect of the present invention and all exemplary embodiments thereof when the computer program is executed on a processor.

According to the second aspect of the present invention, further a readable medium is disclosed, having a program according to the method of the second aspect of the present invention stored thereon. The readable storage medium may for instance be a computer-readable or processor-readable storage medium. It may be embodied as an electric, magnetic, electromagnetic, optic or other storage medium, and may either be a removable storage medium or a storage medium that is fixedly installed in an apparatus or device.

According to the second aspect of the present invention, further a first apparatus is disclosed, configured to perform the method according to the second aspect of the present invention.

According to the second aspect of the present invention, further a second apparatus is disclosed, comprising at least one processor, and at least one memory including computer program code, the at least one memory and the computer program code configured to, with the at least one processor, cause the apparatus at least to check whether a position-related point representing, in a one- or multidimensional space, a position-related information collected by a device is comprised in at least one accumulation zone corresponding to a point of interest stored in a database; and provide the point of interest corresponding to the accumulation zone only if the checking yields a positive result.

According to the second aspect of the present invention, further a third apparatus is disclosed, comprising means for checking whether a position-related point representing, in a one- or multidimensional space, a position-related information collected by a device is comprised in at least one accumulation zone corresponding to a point of interest stored in a database; and means for providing the point of interest corresponding to the accumulation zone only if the checking yields a positive result.

The first apparatus, the second apparatus or the third apparatus according to the second aspect of the present invention may for instance be the device which collects the position-related information or a part thereof. Alternatively, the first apparatus, the second apparatus or the third apparatus may for instance be a server that is configured to obtain the collected position-related information from the device or a part thereof.

The first apparatus, the second apparatus or the third apparatus according to the second aspect of the present invention may further comprise a user interface. For instance, the apparatus may be a mobile phone. The mobile phone may comprise user interface circuitry and user interface software configured to facilitate user control of at least some functions of the mobile phone through use of a display and configured to respond to user inputs and a display circuitry configured to display at least a portion of a user interface of the mobile phone, the display and display circuitry configured to facilitate user control of at least some functions of the mobile phone.

According to the second aspect of the present invention, further a system is disclosed, comprising a device configured to collect a position-related information; and a server comprising first, second or third apparatus according to the first aspect of the present invention. The device is configured to transmit the position-related information to the server.

According to a third aspect of the present invention, a method is disclosed, performed by an apparatus, comprising collecting position-related information at a device; transmitting the position-related information from the device to a server; and receiving, at the device, a point of interest corresponding to an accumulation zone from the server, the accumulation zone identified by the server to comprise a position-related point representing, in a one- or multidimensional space, the collected position-related information.

According to the third aspect of the present invention, further a computer program is disclosed, comprising program code for performing the method according to the third aspect of the present invention and all exemplary embodiments thereof when the computer program is executed on a processor.

According to the third aspect of the present invention, further a readable medium is disclosed, having a program according to the method of the third aspect of the present invention stored thereon. The readable storage medium may for instance be a computer-readable or processor-readable storage medium. It may be embodied as an electric, magnetic, electromagnetic, optic or other storage medium, and may either be a removable storage medium or a storage medium that is fixedly installed in an apparatus or device.

According to the third aspect of the present invention, further a first apparatus is disclosed, configured to perform the method according to the third aspect of the present invention.

According to the third aspect of the present invention, further a second apparatus is disclosed, comprising at least one processor, and at least one memory including computer program code, the at least one memory and the computer program code configured to, with the at least one processor, cause the apparatus at least to collect position-related information at a device; transmit the position-related information from the device to a server; and receive, at the device, a point of interest corresponding to an accumulation zone from the server, the accumulation zone identified by the server to comprise a position-related point representing, in a one- or multidimensional space, the collected position-related information.

According to the third aspect of the present invention, further a third apparatus is disclosed, comprising means for collecting position-related information at a device; means for transmitting the position-related information from the device to a server; and means for receiving, at the device, a point of interest corresponding to an accumulation zone from the server, the accumulation zone identified by the server to comprise a position-related point representing, in a one- or multidimensional space, the collected position-related information.

The first apparatus, the second apparatus or the third apparatus according to the third aspect of the present invention may for instance be the device which collects the position-related information or part thereof.

The first apparatus, the second apparatus or the third apparatus according to the third aspect of the present invention may further comprise a user interface. For instance, the apparatus may be a mobile phone. The mobile phone may comprise user interface circuitry and user interface software configured to facilitate user control of at least some functions of the mobile phone through use of a display and configured to respond to user inputs and a display circuitry configured to display at least a portion of a user interface of the mobile phone, the display and display circuitry configured to facilitate user control of at least some functions of the mobile phone.

According to the third aspect of the present invention, further a system is disclosed, comprising a device comprising the first, second or third apparatus according to the third aspect of the invention; and a server. The server is configured to receive the position-related information from the device, determine the point of interest, and transmit the point of interest to the device.

In the following, embodiments of the present invention will be explained. This description shall be understood to equally apply to the methods, apparatuses, computer programs and systems of the aspects of the present invention. In particular, a description of a method step or action of a method of an aspect of the invention shall be understood as a disclosure of corresponding functional means of an apparatus and system according to this aspect of the present invention, of an according configuration of an apparatus and system according to this aspect of the present invention and of corresponding program code of a computer program according to this aspect of the present invention. This shall also hold vice versa, i.e. in a way that a description of structural features of an apparatus or system according to an aspect of the invention shall be understood to disclose according method steps and computer program code of this aspect of the invention etc.

According to the first aspect of the invention, a method for identifying a POI is disclosed. The method may be performed by the first, second or third apparatus according to the first aspect of the invention.

The at least one device collecting the position-related information may for instance be a mobile terminal, like a mobile phone, a personal digital assistant (PDA), a handheld game console, a notebook, a digital music player or a navigation device, to name but a few examples.

An apparatus obtains position-related information collected by such a device. The apparatus may be such a device or may be a different entity, like a server. For instance, one or more devices have collected position-related information. Position-related information may for instance be at least one radio signal sent by coverage providing entities (such as for instance one or more cellular base stations, one or more WLAN access points, and/or one or more radio/television broadcast stations, to name but a few examples). The position-related information may for instance represent or allow derivation of a physical position at which a device has been located. The apparatus may for instance obtain position-related information which has been collected at a plurality of time points. For instance, the position-related information has been collected periodically.

It shall be understood that according to other variants of the present invention, two or more devices can be deployed. Each of these devices may collect respective position-related information at different time points, for instance, in a periodic manner.

Furthermore, the position-related information can be mapped into a one- or multidimensional space (wherein the term "multi-dimensional" is understood to relate to two or more dimensions). More particularly, at least one obtained position-related information can be represented as a position-related point in a one- or multidimensional space. In other words, preferably all obtained position-related information can be stored in the space as respective position-related points.

It has been found that position-related information may represent physical places at which the collecting device has resided. Furthermore, it has been found that a point of interest (POI) may for instance correspond to a physical place or physical location at which the device has been located for a specific time period, which may for instance have a pre-defined or adaptively determined duration. The plurality of collected position-related information collected during the time period, namely at two or more time points, may for instance be approximately equal to each other. They can for instance be represented as position-related information points which may for instance be located close to each other in the one- or multidimensional space.

An accumulation zone may represent a POI. A POI may be an object which has a unique identifier (of some kind). Furthermore, a POI may for instance represent a specific point location that someone may find useful or interesting, such as buildings, particular points of a building, a particular landscape point, or other points which are meaningful to a user. The POI may be presented directly. POIs may for instance be represented by textual descriptions of locations. It may be also possible that an identified POI can be tagged with physical coordinate indications using for instance triangulation techniques.

For identifying POIs, accumulation zones of the position-related points are detected. Accumulation zones or clusters are limited regions or clouds in the one- or multidimensional space comprising at least more position-related points than other regions in the one- or multidimensional space.

According to a first exemplified embodiment of the first aspect of the invention, obtaining position-related information comprises obtaining all receivable coverage area signals which exceed at least one signal threshold. Herein, a coverage area signal is considered as a signal from an entity that provides coverage in a coverage area. The threshold can for instance be pre-defined or adaptively selected. The threshold may for instance be considered to be exceeded if a device can "hear" the coverage providing entity or entities of the coverage area. A device may for instance be considered to "hear" a coverage providing entity if it is able to receive one or more signals (e.g. a broadcast channel), which are sent by the coverage providing entity, with a pre-defined minimum quality (for instance defined in terms of a signal-to-noise ratio, a signal-to-noise and interference ratio, or signal strength), and/or if the device is capable of at least partially receiving and correctly decoding one or more signals sent by the coverage providing entity (e.g. a broadcast channel), and/or if the device is able to receive and correctly decode a coverage providing entity identifier (for instance a Medium Access Control (MAC) address or another identifier).

A device may for instance be considered to be associated with a coverage area if it is able to "hear" the coverage providing entity or entities of the coverage area. A device may be associated with more than one coverage area at a time, for instance with a coverage area that represents a serving cell of a cellular radio communication system or the like and one or more coverage areas that represent neighbouring cells with respect to the serving cell.

Furthermore, according to another embodiment of the first aspect of the present invention, at least one coverage area identification is determined from each collected coverage area signal. Every coverage area signal sent by a different coverage providing entity may for instance be provided with a unique identifier corresponding to the sender. A non-limiting example of such an identifier is an identifier of a coverage providing entity (e.g. an identifier of a base station of a cellular radio communication system or a WLAN AP (e.g. a Medium Access Control (MAC) address)), for instance for cases where each coverage area is provided by a single coverage providing entity. A further non-limiting example of such an identifier is a Location Area Code (LAC) of a cellular radio communication system (e.g. a Global System for Mobile Communication (GSM) system) that then may pertain to several coverage providing entities.

According to a further embodiment of the first aspect of the present invention, at least one signal parameter value is determined from each collected coverage area signal.

Non-limiting examples of signal parameter values are a quality parameter, such as a signal-to-noise ratio or a signal-to-noise and interference ratio, a signal strength value or the like. Preferably, the at least one signal parameter value may be an indicator for the actual physical position of the device. In particular, the coverage area identification together with the respective signal parameter value, such as the signal strength value, can be easily mapped into a one- or multidimensional space. The respective position-related point may for instance represent a physical place or physical location at which the device has been located at at least one time point.

In addition, according to a further embodiment of the first aspect of the present invention, at least one coverage area identification is assigned to at least one dimension of the one- or multidimensional space, wherein the dimension comprises a coordinate corresponding to the signal parameter value. In particular, for all possibly receivable coverage area identifications, a respective dimension can for instance be provided. The respective coordinates may correspond accordingly to the signal parameter value, such as the signal strength of the coverage area signal. All position-related information can be mapped into such a one- or multidimensional space.

According to a further embodiment of the first aspect of the invention, representing at least one position-related point in the space further comprises storing the determined coverage area identification and the respective signal parameter value of at least one received coverage area signal as a position-related point in the space. Preferably, the position-related points may represent the positions at which the device has been located. In other words, by storing a plurality of position-related points, the route of the at least one device can be tracked.

As previously described, POIs can be identified by detecting accumulation zones in the one- or multidimensional space.

Further, according to another embodiment of the first aspect of the invention, it can be detected whether the number of the position-related information points within the accumulation zone exceeds at least one density threshold, which may for instance be pre-defined or adaptively selected. Alternatively or additionally, it can for instance be detected whether the distance between at least two neighboured position-related information points falls below a distance threshold, which may for instance be pre-defined or adaptively selected. By predefining at least one threshold value, preferably at least two threshold values, accumulation zones can be easily detected. By way of example, the maximum allowable distance between two neighboured position-related points and/or the minimum number of position-related points within a limited region can be predefined. Thereby, the minimum number of position-related points within a limited region may depend on the total number of position-related information points and/or the number of possibly receivable coverage area signals. The maximum distance threshold may depend on the used signal parameter value. For instance, in case of signal strength as signal parameter value, the threshold value can be chosen such that disturbances due to environmental conditions, such as different weather conditions, different number of users and/or devices, and the like, do not distort the measurements and results. For instance, using the signal strength as a signal parameter value and WLAN access points as identifications, the threshold value may for instance be 5 dBm to 15 dBm, preferably for instance 10 dBm.

For detecting the accumulation zone in a fast manner, according to a further embodiment of the first aspect of the invention, at least one density clustering algorithm is applied to the position-related points. Non-limiting examples of a density clustering algorithm are Density-Based Spatial Clustering of Applications with Noise (DBSCAN) algorithm (ref. Martin Ester, Hans-Peter Kriegel, Jörg Sander, Xiaowei Xu: A density-based algorithm for discovering clusters in large spatial databases with noise. In: Evangelos Simoudis, Jiawei Han, Usama M. Fayyad (Hrsg.): Proceedings of the Second International Conference on Knowledge Discovery and Data Mining (KDD-96). AAAI Press, 1996, ISBN 1-57735-004-9, S. 226-231) or Ordering Points To Identify the Clustering Structure (OPTICS) algorithm (ref: Ankerst, M., Breunig, M. M., Kriegel, H., and Sander, J. 1999. OPTICS: ordering points to identify the clustering structure. SIGMOD Rec. 28, 2 (June 1999), 49-60. DOI=http://doi.acm.org/10.1145/304181.304187), to name but a few examples.

After detecting at least one accumulation zone, by, for instance, using a density clustering algorithm, the at least one identified POI can be mapped against at least one existing specific point location database. For instance, the existing specific point location database can comprise a list with a plurality of specific point locations having respective meaningful denotations, such as building name, street name, office number, or the like. Furthermore, these specific point locations can be previously determined in a conventional manner. By way of example, the mapping can be performed by using a nearest geo-tag method (if the pre-existing list uses geo-tags), which may involve some triangulation work. A geo-tag method may be a process of adding geographical identification metadata to the accumulation zone. The geographically nearest locations can be mapped to an accumulation zone. The identified POI can be associated to the respective specific point location. The at least one POI can be stored together with the respective specific point location in a database. Preferably, all (but equally well only some) POIs and their respective specific point locations can be stored in a database. It shall be understood that the specific point location database and/or the database used for storing the POIs and the respective specific point locations can be arranged entirely or partly on one or more devices and/or entirely or partly on one or more servers. It shall be further understood that merely one or a plurality of databases can be provided to store the respective data.

For determining the POI corresponding to the actual physical position of the device, according to a further embodiment of the first aspect of the invention, position-related information is received by the apparatus. Furthermore, the POI corresponding to the received position-related information can be determined by checking whether the received position-related information is comprised in at least one accumulation zone stored in the database. It can be checked whether the received position-related information is "inside" the accumulation zone. The POI can be determined directly depending on the received position-related information. A conversion into physical coordinates, like longitude and latitude coordinates, is not necessary. Thus, a further conversion from longitude and latitude to a POI is also not required. Besides a faster determination of POIs the POI can be also determined with a higher precision.

According to a further embodiment of the first aspect of the invention, at least one hull points set is established, wherein hull points of the hull points set may for instance form the outer boundary of the accumulation zone. More particularly, the hull points which may be also position-related points or additionally added points may span a complex hull. For instance, the complex hull of an accumulation can be computed. The complex hull may preferably comprise all or at least approximately all position-related points of an accumulation zone. In particular, merely as many points as needed to comprise at least the most position-related points can be established. An accumulation zone can be represented by merely a subset of points.

The specific point locations corresponding to the accumulation zones defined by the respective hull points sets can be determined as previously described. The at least one identified POI may be associated to at least one established hull points set. Furthermore, the at least one point of interest may be stored together with the associated hull points set in the database. Merely a minimum number of data has to be stored while each accumulation zone can be unambiguously identified by the respective hull points sets. Preferably, all hull points sets and their respective POIs can be stored in a database. It shall be understood that the database can be arranged entirely or partly on one or more devices and/or entirely or partly on one or more server.

For determining the POI corresponding to the actual physical position of the device, according to a further embodiment of the first aspect of the invention, position-related information is received by the apparatus. In addition, the POI corresponding to the received position-related information may be determined by checking whether the received position-related information is comprised in at least one hull point set stored in the database. For instance, it can be checked whether the received position-related information is "inside" a computed convex hull spanned by the hull points. The POI can be determined directly depending on the received position-related information. A conversion into physical coordinates is not necessary. Thus, a further conversion from longitude and latitude to a POI is also not required. Besides a faster determination of POIs the POI can be also determined with a higher precision.

According to another embodiment of the first aspect of the invention, further attributes are associated to the at least one accumulation zone and the hull points set, respectively. An attribute may for instance be a semantic label, like the name of a building, street or the like, and/or geographical location information, like a picture or meaningful sign.

Furthermore, the position-related points which may be stored in the one- or multidimensional space can for instance be updated periodically as well as accumulation zones can be detected regularly. For instance, newly collected position-related information can be represented as new position-related points while older position-related points, which may be invalid in the mean time, can be removed. Further, by way of example, a density clustering algorithm can be periodically applied for detecting new accumulation zones or accumulation zones which do not exist any more, and the like.

It shall be understood that updating can be performed in an unsteady manner. It shall be further understood that newly identified POIs can be mapped against the specific point location database and stored together with the respective specific point location in a database.

According to the second aspect of the invention, a method for providing a POI is disclosed. The method may be performed by the first, second or third apparatus according to the second aspect of the invention.

For determining and providing directly a POI depending on position-related data, according to the second aspect of the invention, it is checked if a position-related point representing, in a one- or multidimensional space, a position-related information collected by a device is comprised in at least one accumulation zone corresponding to a POI stored in a database.

The collected position-related data may represent the physical position of the collecting device. A database can be provided which comprises a plurality of previously identified and detected accumulation zones. Each of the accumulation zones may correspond to a respective POI, wherein, as previously described, a POI may be characterized by the fact that one or more devices have been located at or close to the physical position corresponding to the POI a plurality of times. An accumulation may comprise a one- or multidimensional cloud which comprises position-related points corresponding to respective position-related information.

More particularly, one or more of collected position-related information are represented as respective position-related points in a one- or multidimensional space. Position-related information can be mapped to a one- or multidimensional space which is stored in a database.

If the position-related information collected by the device is comprised in an accumulation zone, the POI corresponding to the accumulation zone is provided. In particular, the POI can be directly provided without the need to convert position-related information to physical coordinates and/or physical coordinates to a POI. It can thus be checked in a fast and simple manner whether a device which has collected position-related information is located at a POI.

If the checking yields a negative result, it may be possible to use standard positioning methods. Another option may be to provide a message that a POI cannot be provided or the like. Furthermore, this information can be passed to some client applications running for instance on other mobile devices and/or servers via some Application Programming Interface (API). It may be interesting to know that the device collecting the position-related information is not at a known place. For example, the user of the device may be interested in receiving direction information from the device.

According to a first exemplified embodiment of the method according to the second aspect of the invention, checking whether a position-related point representing, in a one- or multidimensional space, a position-related information collected by a device is comprised in at least one accumulation zone comprises checking whether the position-related information is comprised in at least one hull points set defining the at least one accumulation zone. As previously described, for reducing the data to be stored in a database needed to determine POI based on position-related information, it may be advantageous to store merely a hull points set which defines the accumulation zone unambiguously instead of storing all position-related points of the accumulation zone.

For instance, the hull points of the hull points set may form an outer boundary of the accumulation zone. The hull points may span a complex hull comprising at least most of the position-related points of the accumulation zone, as pointed out hereinbefore. For checking whether a position-related information collected by a device is comprised in at least one accumulation zone, it is merely necessary to check whether the position-related information falls in the complex hull spanned by the hull points.

Furthermore, according to a further embodiment of the second aspect of the invention, at least one point of interest is identified by detecting at least one accumulation zone from the position-related points in the space. After obtaining some, preferably a plurality, of respective position-related information collected by one or more devices at one or more time points, and for instance, after mapping them to the one- or multidimensional space, a POI can be identified. For instance, it can be detected whether in a limited region or cloud comprises at least more position-related points than the surrounding area.

Furthermore, as described also with respect to the first aspect of the invention, collected position-related information may comprise all receivable coverage area signals which exceed at least one signal threshold. In particular, a device may receive all coverage area signals which it can "hear", as described in depth hereinbefore.

According to a further embodiment of the method according to the second aspect of the invention, for checking whether a position-related point representing, in a one- or multidimensional space, a position-related information collected by a device is comprised in at least one accumulation zone, at least one coverage area identification is determined from at least one coverage area signal. Further, the respective signal parameter value of the respective coverage area signal can be determined as well. Preferably, the coverage area identification and signal parameter values, for instance the signal strength, of all receivable coverage are signals are determined. The determined result can also be called radio signature. In an easy way, it can be checked whether the radio signature is comprised by an accumulation zone and the respective POI can be provided.

According to a further embodiment of the method according to the second aspect of the invention, at least one coverage area identification determined from at least one coverage area signal is assigned to at least one dimension of the one- or multidimensional space, wherein the dimension comprises a coordinate corresponding to a signal parameter value determined from the coverage area signal. Such a space is particular suitable to map obtained position-related information to respective position-related points and to provide POIs directly in a fast manner. For instance, the determined coverage area identification and the respective signal parameter value of at least one received coverage area signal can be stored as a position-related point in the space, as described hereinbefore.

Furthermore, to detect reliably all accumulation zones in a fast manner, the accumulation zone may be detected by detecting whether a number of the position-related points within the accumulation zone exceeds at least one density threshold and/or whether a distance between at least two neighboured position-related points falls below at least one distance threshold, as pointed out hereinbefore in connection with the first aspect of the invention.

According to a further embodiment of the method according to the second aspect of the invention, detecting the accumulation zone comprises applying at least one density clustering algorithm to the position-related points. As previously described, DBSCAN algorithm or OPTICS algorithm are for instance suitable for determining the accumulation zones.

To store a reduced amount of data, a point of interest is associated to at least one established hull points set, and at least one point of interest stored together with the associated hull points set in the database. In particular, for each detected accumulation zone, the respective hull points set can be associated to respective POIs and stored in a database, as previously pointed out with respect to the first aspect of the invention. In particular, the POIs corresponding to collected position-related information can be provided in a fast manner due to reduced data to be searched for providing a POI.

Furthermore, according to a further embodiment of the second aspect, the at least one identified POI can be mapped against at least one existing specific point location database, as previously pointed out.

Furthermore, besides the POI, further data can be provided. It may be possible to associate further attributes to the POIs or respective accumulation zones and store this data in the database. According to another embodiment of the method according to the second aspect of the invention, further attributes can be provided to the at least one POI, wherein an attribute is at least a semantic label and/or a geographical location information.

Furthermore, as described hereinbefore, the position-related points stored in the one- or multidimensional space can for instance be updated periodically as well as accumulation zones can be detected regularly. For instance, newly collected position-related information can be represented as new position-related points while older position-related points, which may be invalid in the mean time, can be removed. Further, by way of example, a density clustering algorithm can be periodically applied for detecting new accumulation zones or accumulation zones which do not exist any more, and the like.

It shall be understood that updating can be performed in an unsteady manner. It shall be further understood that newly identified POIs can be mapped against the specific point location database and stored together with the respective specific point location in a database.

According to the third aspect of the invention, a method for collecting position-related information and receiving a respective POI is disclosed. The method may be performed by the first, second or third apparatus according to the third aspect of the invention.

For determining the actual physical position of a device, in particular, for determining a respective POI, position-related information is collected at the device. The collected position-related information can be transmitted to a central entity, for instance, a central server or the like, which comprises at least a database. In the database, the identified POIs and/or the respective hull points sets can be stored.

The device receives a POI corresponding to an accumulation zone from the server, the accumulation zone identified by the server to comprise a position-related point representing, in a one- or multidimensional space, the position-related information collected by the device.

According to a first embodiment of the method according to the third aspect of the invention, collecting position-related information comprises collecting all receivable coverage area signals which exceed at least one signal threshold. Herein, as previously described in connection with the first aspect of the present invention, a coverage area signal is considered as a signal from an entity that provides coverage in a coverage area. The threshold can for instance be pre-defined or adaptively selected. The threshold may for instance be considered to be exceeded if a device can "hear" a connection point such as the coverage providing entity or entities of the coverage area. A device may for instance be considered to "hear" a coverage providing entity if it is able to receive one or more signals (e.g. a broadcast channel), which are sent by the coverage providing entity or any other connection point, with a pre-defined minimum quality (for instance defined in terms of a signal-to-noise ratio, a signal-to-noise and interference ratio, or signal strength), or if the device is capable of at least partially receiving and correctly decoding one or more signals sent by the coverage providing entity (e.g. a broadcast channel), or if the device is able to receive and correctly decode a coverage providing entity identifier (for instance a Medium Access Control (MAC) address or another identifier).

A device may for instance be considered to be associated with a coverage area if it is able to "hear" the coverage providing entity or entities of the coverage area. A device may be associated with more than one coverage area at a time, for instance with a coverage area that represents a serving cell of a cellular radio communication system and one or more coverage areas that represent neighbouring cells with respect to the serving cell.

According to another embodiment of the third aspect of the invention, at least one coverage area identification is determined from at least one collected coverage area signal, and/or at least one signal parameter value is determined from at least one collected coverage area signal. As pointed out hereinbefore, every coverage area signal sent by a different coverage providing entity may for instance be provided with a unique identifier corresponding to the sender. A non-limiting example of such an identifier is an identifier of a coverage providing entity (e.g. an identifier of a base station of a cellular radio communication system or a WLAN AP (e.g. a Medium Access Control (MAC) address)), for instance for cases where each coverage area is provided by a single coverage providing entity. A further non-limiting example of such an identifier is a Location Area Code (LAC) of a cellular radio communication system (e.g. a Global System for Mobile Communication (GSM) system) that then may pertain to several coverage providing entities.

Furthermore, according to another embodiment of the method of the third aspect of the invention, checking whether a position-related point representing the position-related information collected by a device is comprised in at least one accumulation zone comprises checking whether the position-related information is comprised in at least one hull points set defining the at least one accumulation zone. As described hereinbefore, instead of storing all points of an accumulation zone only a reduced number of points which define the accumulation zone unambiguously.

After obtaining some, preferably a plurality of respective position-related information collected by one or more devices at one or more time points and after mapping them to the one- or multidimensional space, a POI can be identified. According to a further embodiment of the third aspect of the present invention, at least one point of interest is identified by detecting at least one accumulation zone from the position-related points in the space. For instance, it can be detected whether in a limited region of cloud are more position-related points than in the surroundings.

As elucidated hereinbefore, according to another embodiment of the method of the third aspect of the invention, a point of interest is associated to at least one established hull points set, and at least one point of interest stored together with the associated hull points set in the database.

According to a further embodiment of the method according the third aspect of the invention, at least one coverage area identification determined from at least one coverage area signal is assigned to at least one dimension of the one- or multidimensional space, wherein the dimension comprises a coordinate corresponding to a signal parameter value determined from the coverage area signal. Such a space is particular suitable to map position-related information to respective position-related points.

For instance, the determined coverage area identification and the respective signal parameter value of at least one received coverage area signal can be stored as a position-related point in the space, as described hereinbefore.

Furthermore, to detect reliably all accumulation zones in a fast manner, the accumulation zone may be detected by detecting whether a number of the position-related points within the accumulation zone exceeds at least one density threshold and/or whether a distance between at least two neighboured position-related points falls below at least one distance threshold.

Furthermore as previously described in connection with the first and second aspect, detecting the accumulation zone according to a further embodiment of the third aspect, comprises applying at least one density clustering algorithm to the position-related points.

Furthermore, according to a further embodiment of the third aspect, the at least one identified POI can be mapped against at least one existing specific point location database, as previously described.

It may be advantageous to receive besides the POI further attributes of the POI. According to an embodiment of the third aspect of the present invention, further attributes associated to the POI are received, wherein an attribute is a semantic label, and/or a geographical location information.

The embodiments of the present invention according to the first, second and third aspect described above and their single features shall be understood to be disclosed also in all possible combinations with each other.

Further, it is to be understood that the presentation of the invention in this section is based on non-limiting example embodiments.

Other features of the invention will be apparent from and elucidated with reference to the detailed description presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

BRIEF DESCRIPTION OF THE FIGURES

In the figures show.

DETAILED DESCRIPTION OF EMBODIMENTS OF THE INVENTION

Figure 1A:
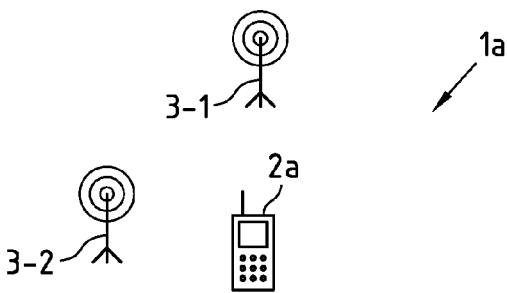
FIG. 1a: An example embodiment of a system according to the invention.

FIG. 1a shows an example embodiment of a system 1a according to the invention. The system comprises a device 2a, which may for instance be a terminal that is capable of operating in one or more radio communication systems, and a plurality of coverage providing entities of these one or more communication systems, of which only three coverage providing entities 3-1, 3-2 and 3-3 are shown. Each entity may transmit a coverage area signal comprising each a unique coverage area identification.

The device 2a may obtain periodically collected position-related information. The position-related information can also be collected by another arbitrary order. The device 2a may obtain the position-related information by collecting the respective information itself. More particularly, the device 2a may preferably collect all coverage area signals sent by the respective coverage providing entities 3-1, 3-2 and 3-3. A device 2a can collect a coverage area signal if it can receive the signal. Thereby, it shall be understood that according to other variants of the present invention, one or more thresholds can be defined, such as a signal strength threshold, signal-to-noise threshold or the like, which a coverage area signal has to exceed to be collected.

Furthermore, the device 2a may analyze and process the obtained data for identifying and associating POIs to position-related information. The respective data can be stored as position-related points in a database and used by the device 2a to obtain the actual POI corresponding to the actually received position-related information.

In the embodiment of FIG. 1a, it is assumed that the database, or at least a part thereof, is locally stored in device 2a, so that device 2a can determine POIs by determining which coverage areas it is associated with.

For determining its actual POI, the device 2a can check whether the position-related information actually collected by the device 2a is comprised in at least one accumulation zone corresponding to a point of interest stored in a database of the device 2a, wherein one or more of collected position-related information are represented as respective position-related points in a one- or multidimensional space. Only if the checking yields a positive result the point of interest corresponding to the accumulation zone is provided by the device 2a.

Figure 1B:
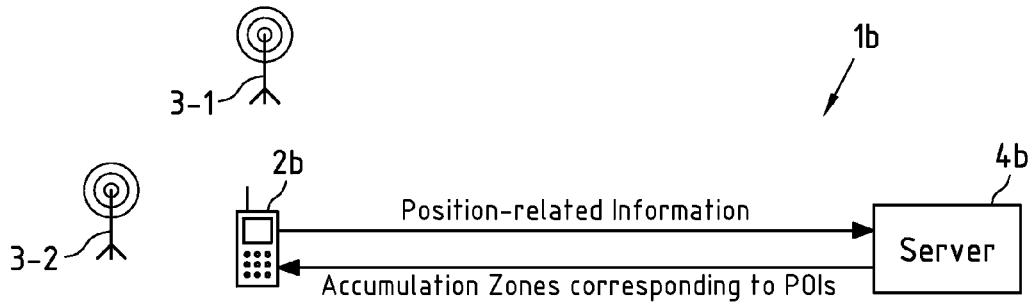
FIG. 1b: a further example embodiment of a system according to the invention.

FIG. 1b shows a further example embodiment of a system 1b according to the invention, which basically resembles the system 1a of FIG. 1a. However, in system 1b, device 1b has the possibility to transmit the plurality of collected position-related information to a server 4b. In other words, the server may obtain position-related information collected at a plurality of time points and then may analyze and process the obtained data for identifying and associating POIs to position-related information. As will be elucidated in detail hereinafter, the server 2b may determine accumulation zones each corresponding to a POI based on the received position-related information. This either allows only storing a part of the accumulation zones corresponding to the POIs in device 2b, for instance the part that is currently required by device 2b for determining the POIs residing in the actual area (for instance when operating in a specific communication system and/or when being located in a specific area), or to receive updated versions of the entire accumulation zones corresponding to the POIs or of parts thereof from time to time. If device 2b only has limited memory, only that amount of accumulation zones corresponding to the POIs required determining a current POI for device 2b may be requested. In the system 1b of FIG. 1b, it is assumed that device 2b determines the POI for device 2b.

Figure 1C:
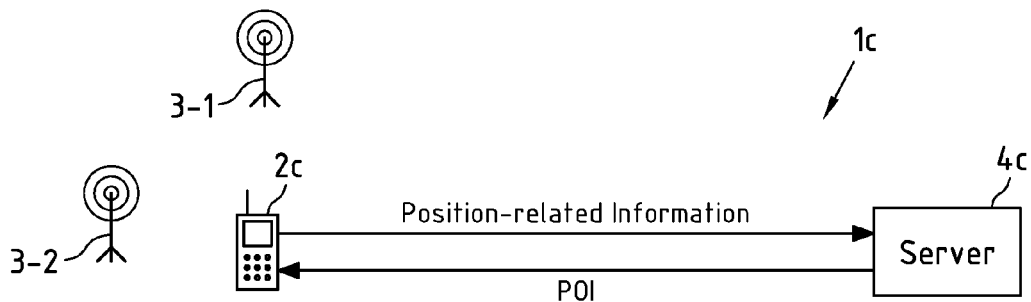
FIG. 1c: a further example embodiment of a system according to the invention.

FIG. 1c shows a further example embodiment of a system 1c according to the invention, which basically resembles the systems 1a and 1b of FIGS. 1a and 1b. However, in system 1c, it is assumed that the database comprising the accumulation zones corresponding to POIs is maintained at server 4c, and that server 4c also determines the actual POI for device 2c, based on position-related information received from device 2c. The POI may then be returned to device 2c, for instance if device 2c requested the positioning, or may be provided to another entity (e.g. an operator of the communication system device 2c is currently active in), for instance to support location based services.

The device 2c may collect position-related information and may receive based on the position-related information transmitted to the server a respective POI if the collected position-related information is comprised in an accumulation zone stored in a database, wherein one or more of the collected position-related information are represented as respective position-related points in a one- or multidimensional space.

Figure 2:
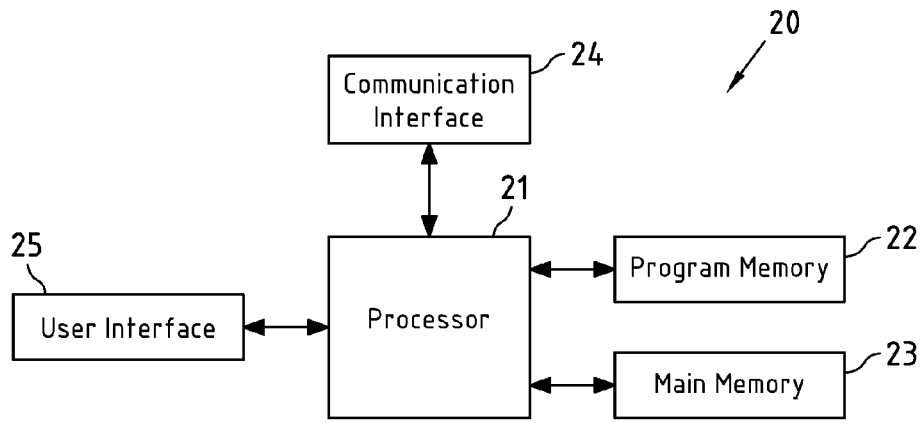
FIG. 2: a schematic block diagram of an example embodiment of an apparatus according to invention, which is or forms a part of a device.

FIG. 2 is a schematic block diagram of an example embodiment of an apparatus 20 according to the invention. Apparatus 20 is or forms a part of device 2a, 2b or 2c of FIGS. 1a-1c.

Apparatus 20 comprises a processor 21, which may for instance be embodied as a microprocessor, Digital Signal Processor (DSP) or Application Specific Integrated Circuit (ASIC), to name but a few non-limiting examples. Processor 21 executes a program code stored in program memory 22 (for instance program code implementing the flowcharts of FIGS. 5-9, if apparatus 20 is part of device 2a or 2b of FIGS. 1a-1b), and interfaces with a main memory 23, which may for instance store at least a part of a database comprising accumulation zones corresponding to the POIs (if apparatus 20 is part of device 2a or 2b of FIGS. 1a-1b). Some or all of memories 22 and 23 may also be included into processor 21. Memories 22 and/or 23 may for instance be embodied as Read-Only Memory (ROM), Random Access Memory (RAM), to name but a few non-limiting examples. One of or both of memories 22 and 23 may be fixedly connected to processor 21 or removable from processor 21, for instance in the form of a memory card or stick.

Processor 21 further controls a communication interface 24 configured to receive and/or output information. Communication interface 24 may thus for instance comprise circuitry such as modulators, filters, mixers, switches and/or one or more antennas to allow transmission and/or reception of signals. For instance, communication interface 24 may be configured to exchange information with coverage providing entities 3-1, 3-2 and 3-3 of FIGS. 1a-1c, for instance according to one or more 2G/3G/4G cellular radio communication systems and/or a WLAN system. Communication interface 24 may in particular enable apparatus 20 to determine if it can hear coverage providing entities.

If apparatus 20 is part of device 2b or 2c of FIGS. 1b-1c, communication interface 24 is further configured to allow information exchange between device 2b or 2c and server 4b and 4c of FIGS. 1b-1c as explained with reference to FIGS. 1b-1c above. This transmission may take place via one or more further communication entities, such as for instance a gateway, and may at least partially be wireless and/or wirebound. Therein, a wireless transmission (for instance between device 2b or 2c and a first communication entity in this transmission path) may for instance be according to a communication system according to which one or more of the coverage providing entities 3-1, 3-2 and 3-3 operate, or according to another communication system.

In some embodiments of the invention, communication interface 24 is further configured to receive signals from satellites of a satellite-based positioning system. This functionality may however not be required by the majority of the other embodiments of the invention.

Processor 21 further controls a user interface 25 configured to present information to a user of apparatus 20 and/or to receive information from such a user. Information presented to the user may for instance comprise information on a POI determined by checking whether received position-related information corresponds to accumulation zones or hull point sets, respectively. User interface 25 may for instance be the standard user interface via which a user of device 2a, 2b or 2c of FIGS. 1a-1c interacts with device 2a, 2b or 2c to control other functionality of device 2a, 2b or 2c, such as making phone calls, browsing the Internet, etc.

Figure 3:
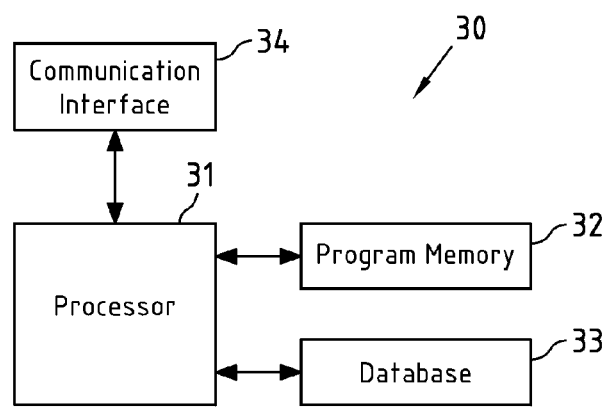
FIG. 3: a schematic block diagram of a further example embodiment of an apparatus according to the invention, which is or forms a part of a server.

FIG. 3 is a schematic block diagram of a further example embodiment of an apparatus 30 according to the invention. Apparatus is or forms a part of server 4b or 4c of FIGS. 1b-1c.

Apparatus 30 comprises a processor 31, which may for instance be embodied as a microprocessor, Digital Signal Processor (DSP) or Application Specific Integrated Circuit (ASIC), to name but a few non-limiting examples. Processor 31 executes a program code stored in program memory 32 (for instance program code implementing the flowcharts of FIGS. 5-8, if apparatus 30 is part of server 4c of FIG. 1c), and interfaces with a database 33, which stores at least a part of a database comprising accumulation zones corresponding to the POIs (if apparatus 30 is part of server 4b or 4c of FIGS. 1b-1c). Memory 32 may also be included into processor 31. Memory 32 may for instance be embodied as Read-Only Memory (ROM), Random Access Memory (RAM), to name but a few non-limiting examples. Memory 32 may be fixedly connected to processor 31 or removable from processor 31, for instance in the form of a memory card or stick. Memory 33 storing the database (or at least a part thereof) may for instance be embodied as mass storage device, for instance with capacities of several Gigabyte or several Terabyte. It may either be fixedly connected to processor 31, or may be releasably connectable thereto.

Processor 31 further controls a communication interface 34 configured to receive and/or output information. Communication interface 34 may thus for instance comprise circuitry such as modulators, filters, mixers, switches and/or one or more antennas to allow transmission and/or reception of signals. For instance, if apparatus 30 is part of servers 4b or 4c of FIGS. 1b-1c, communication interface 34 may be configured to exchange information with devices 2b and 2c, respectively, as explained with reference to FIGS. 1b-1c above, i.e. via an at least partially wireless and/or wire-bound transmission path that may comprise one or more communication entities. A wire-bound segment of this transmission path may for instance be based on the Internet Protocol (IP), and communication interface 34 may then be configured to allow IP-based communication.

It is to be noted that the circuitry formed by the components of apparatuses 20 and 30 may be implemented in hardware alone, partially in hardware and in software, or in software only, as further described at the end of this specification.

Figure 4:
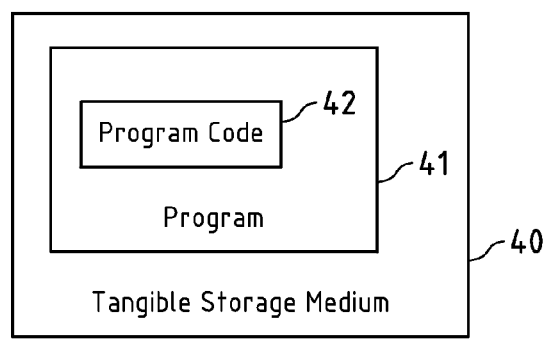
FIG. 4: a schematic presentation of an example embodiment of a tangible storage medium according to the invention.

FIG. 4 is a schematic presentation of an example embodiment of a tangible storage medium 40 according to the invention. This tangible storage medium 40, which may in particular be a non-transitory storage medium, comprises a program 41, which in turn comprises program code 42 (for instance a set of instructions). Realizations of tangible storage medium 40 may for instance be program memories 22 and 32 of FIGS. 2 and 3. Consequently, program code 42 may for instance implement one of the flowcharts of FIGS. 5-9 that will be discussed below.

Figure 5:
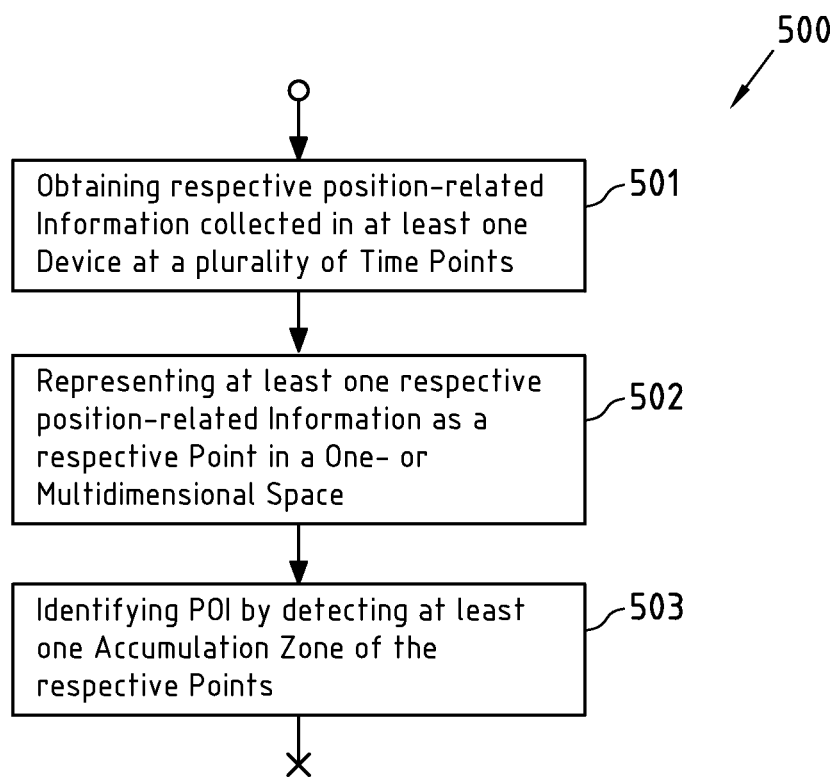
FIG. 5: a flowchart of an example embodiment of a method according to the invention.

FIG. 5 is a flowchart 500 of an example embodiment of a method according to the invention. This method may for instance be performed by device 2a of FIG. 1a, server 4b of FIG. 1b or server 4c of FIG. 1c.

In a step 501, respective position-related information collected by at least one device is obtained by a device 2a or a sever 4b or 4c.

The respective position-related information can be collected by device 2a, 2b or 2c or further devices (not depicted) at a plurality of different time points. The device 2a, 2b or 2c may for instance collect position-related information periodically. Each position-related information may be comprised of a plurality of coverage area signals sent from different coverage providing entities 3-1, 3-2 and 3-3. As described above, each coverage providing entity 3-1, 3-2 or 3-3 may send a corresponding coverage area signal having a coverage area identification corresponding unambiguously to the sender. By way of example, such a coverage area identification may be a cell tower ID, MAC address, satellite ID, etc. Furthermore, each received coverage area signal may be received by device 2a, 2b or 2c with a particular signal strength which may depend on the actual physical position of the device 2a, 2b or 2c.

Furthermore, the position-related information to be collected by a device 2a, 2b or 2c may change depending on the actual physical position of the device 2a, 2b or 2c. For instance, if the device 2a, 2b or 2c is moved from one physical location to another physical location, the received position-related information may change since, for instance, the coverage area signals of some coverage providing entities 3-1, 3-2 and 3-3 are not received or are received with a less or stronger signal strength. If the device 2a, 2b or 2c stays at its physical location the device 2a, 2b or 2c may collect in each measurement at least approximately the same position-related information.

In other words, by collecting the position-related information periodically, the path of the respective devices 2a, 2b, 2c can be tracked. For positions at which the devices 2a, 2b or 2c remains for some time, a plurality of approximately equal measurements can be taken while during moving merely one or some approximately equal measurements can be obtained. Therefore, it can be assumed that a plurality of approximately equal measurements may correspond to a POI.

Then, after obtaining the collected position-related information by device 2a, or server 4b or 4c, in a further step 502, each of the collected position-related information is represented and stored as a respective position-related point in a one- or multidimensional space. By way of example the coordinates of the space may represent possible signal strength values of possible coverage providing entities. Then the received coverage area identifications and the respective signal strength of each time point may be stored as a position-related point in the space.

It shall be understood that alternatively other signal parameter values which represent and/or correspond to the actual physical position of the device can be taken into account.

In step 503, POIs are identified. By way of example, at least one accumulation zone for the respective position-related point can be detected. A plurality of respective position-related information points within a limited zone may result from the fact that a device has received at a plurality of time points at least almost the same position-related information. For instance, the device has stayed at the same physical location for a respective time period.

For detecting such an accumulation zone, at least one density threshold can be predefined. There are several possibilities to perform the detecting step, some of which will be pointed out hereinafter.

If an accumulation zone is detected, and the respective POI is identified, the POI can be tagged with physical coordination indications using for instance triangulation techniques or intersection techniques. The determined data can be stored in a database. Furthermore, the at least one identified POI can be mapped against at least one existing specific point location database, as previously pointed out.

If a user comprising a device, such as a mobile terminal, wants to determine his/her actual physical position, the device may collect position-related information. After checking whether a position-related point representing the position-related information is comprised by an accumulation zone, the respective POI can be provided and presented to the user for instance by a display.

Figure 6:
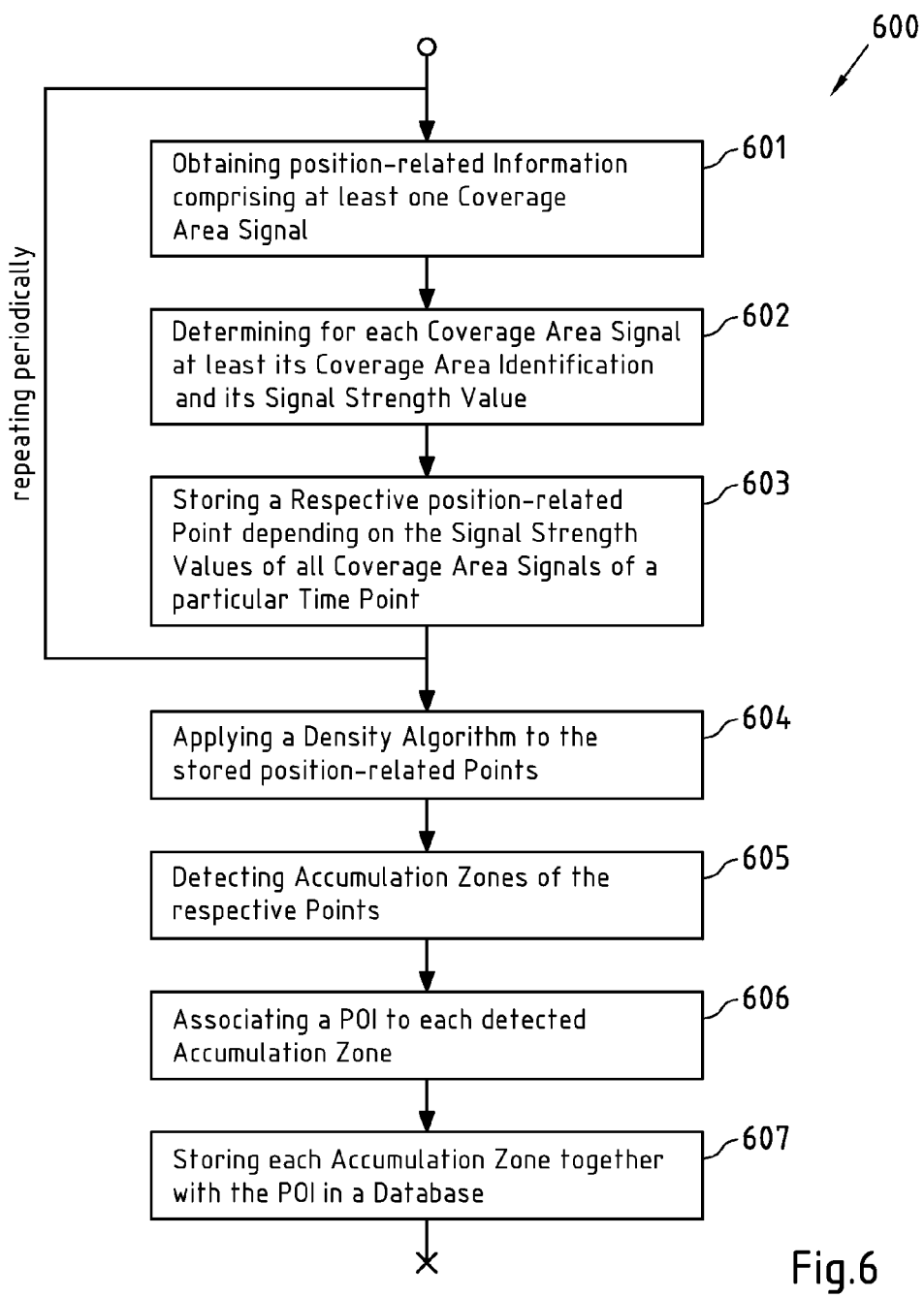
FIG. 6: a flowchart of a further example embodiment of a method according to the invention.

FIG. 6 is a flowchart 600 of a further example embodiment of a method according to the invention. This method may for instance be performed by device 2a of FIG. 1a, server 4b of FIG. 1b or server 4c of FIG. 1c.

In a first step 601, position-related information is obtained, wherein the position-related information comprises at least one coverage area signal. As described hereinbefore, a device 2a, 2b or 2c may collect preferably all receivable coverage area signals for a particular time point. If device 2a collects the position-related information, the obtaining step may be the collecting step.

In a next step 602, the sender of the at least one coverage area signal is obtained by determining its coverage area identification from the coverage area signal. In addition, the signal strength value of each collected coverage area signal can be determined.

Optionally, after the signal strength value is determined, it can be checked whether the signal strength exceeds a predefined minimal signal strength threshold. If the signal strength value does not exceed the threshold the respective signal may be not taken into account. It shall be understood that also all received signals can be taken into account independent from their respective signal strength.

Moreover, in a further step 603, the obtained data is stored within a one- or multidimensional space. In more detail, the number of dimensions of the space may depend on the number of different coverage area signals, thus coverage area signals comprising different identifications. For instance, the number of dimension of the multidimensional space may as large as the number of possible cell IDs, MAC addresses and satellites.

Further each measurement (all signals present at one time point) may be represented as a position-related point in the multidimensional space. The coordinates of the position-related point may correspond to the signal strengths for each of these objects (thus, in practice, most of the coordinates are zero, except for a few).

After storing the position-related point it can be continued with step 601. It shall be understood that the steps 601, 602 and 603 can be also executed in parallel.

When at least some position-related information points are stored, in particular, a plurality of position-related information points are stored in a database, for identifying POIs, accumulations zones and clusters, respectively, can be detected.

In step 604, a density algorithm, such as DBSCAN, OPTICS or the like, can be applied to the stored position-related points. For instance, the DBSCAN algorithm is a density-based clustering algorithm since it can find a number of accumulation zones starting from the estimated density distribution of corresponding points. It requires two predefinable threshold parameters, i.e. the distance $\epsilon$ and the minimum number of points required to form a cluster.

The OPTICS algorithm is based on the DBSCAN algorithm. However, in contrast to DBSCABN, the points of the database are (linearly) ordered such that points which are spatially closest become neighbours in the ordering. Additionally, a special distance can be stored for each point that represents the density which needs to be accepted for a cluster in order to have both points belong to the same cluster. This can be represented as a dendrogram.

By applying such a density algorithm, accumulation zones of position-related points can be detected (step 605). As previously pointed out, an accumulation zone results from the fact that one device was located a long time period at the same physical location and/or that a plurality of devices was located at the same physical location. This may be an indication for a POI. The POI corresponding to the accumulation zone can then be tagged with standard physical coordinates using state-of-the-art triangulation techniques or the like. Alternatively or additionally, the at least one identified POI can be mapped against at least one existing specific point location database, as previously pointed out.

After detecting an accumulation zone and identifying a respective POI, the respective data can be stored in a database. The database may be arranged entirely or partly in the device 2a or 2b or the server 4b or 4c.

Figure 7:
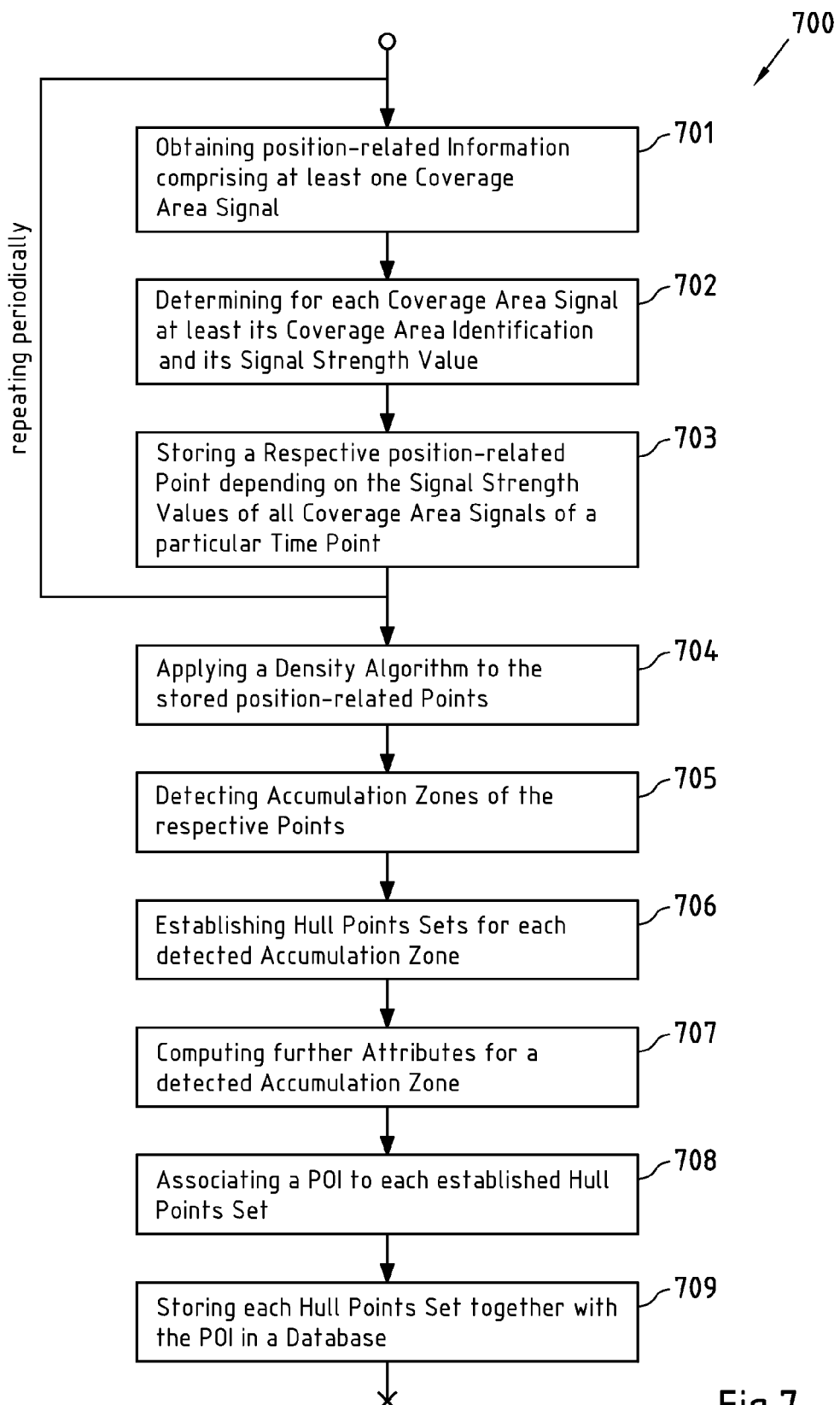
FIG. 7: a flowchart of a further example embodiment of a method according to the invention.

FIG. 7 is a flowchart 700 of a further example embodiment of a method according to the invention. This method may for instance be performed by device 2a of FIG. 1a, server 4b of FIG. 4b or server 4c of FIG. 1c.

FIG. 7 shows an example of a method 700 according to a third embodiment of the invention, which basically resembles the method 600 of FIG. 6. However, in method 700, in step 706 hull points sets are established for each detected accumulation zone. Each hull point set representing an accumulation can also be called a radio signature and may comprise two or more hull points which may form the outer boundary of a cluster. More particularly, the hull points may span a complex hull which comprises (at least almost) all points of the detected accumulation zone. In other words, this set of hull points may form the radio signature of the respective cluster. It is not necessary to store all possible position-related points of an accumulation zone but merely a few which define the respective accumulation zone.

Furthermore, in step 707, for each detected accumulation zone, optionally, other attributes can be computed, such as its geographical location (by averaging GPS measurements made simultaneously with a radio measurement that falls within the radio-signature of the accumulation zone) or some semantic label (by some method not described in this invention, such as mapping with existing POI database, user assisted labelling, etc).

In next step 708, the POIs can be associated with respective hull point sets.

The accumulation zones, in particular, the respective hull point sets, and their attributes can be stored in a database (step 709).

The list of points (measurements) that need to be stored depends on the purpose. For instance, the database may be stored on the device 2a that performs the clustering itself or the database may be stored on a central server 4c which performs the clustering itself. It may be also possible that at least parts can be stored on the device 2b and at least parts can also be stored on server 2b. Preferably, the full list of measurements may be kept on a server 2b or 2c to providing the database to a plurality of devices.

Furthermore, by way of example, older position-related points can be dropped in order to allow for some adaptively, though. For instance, some older position-related points may be no more valid. Such points can be dropped. In addition, newly obtained position-related information can be added as a respective point.

On the device 2a, 2b which may use the result of the clustering to detect whether it is located in a POI, only the convex hull, namely the hull points sets, may be necessary. However, also this data may be stored on a central server 4c and may be requested by the device 2c, if required.

The clustering can be done locally on the device 2a. Then all points need to be kept on the device 2a. If the clustering is performed jointly for several users by a central server 4b or 4c then device 2b may need only to know the resulting convex hulls.

Figure 8:
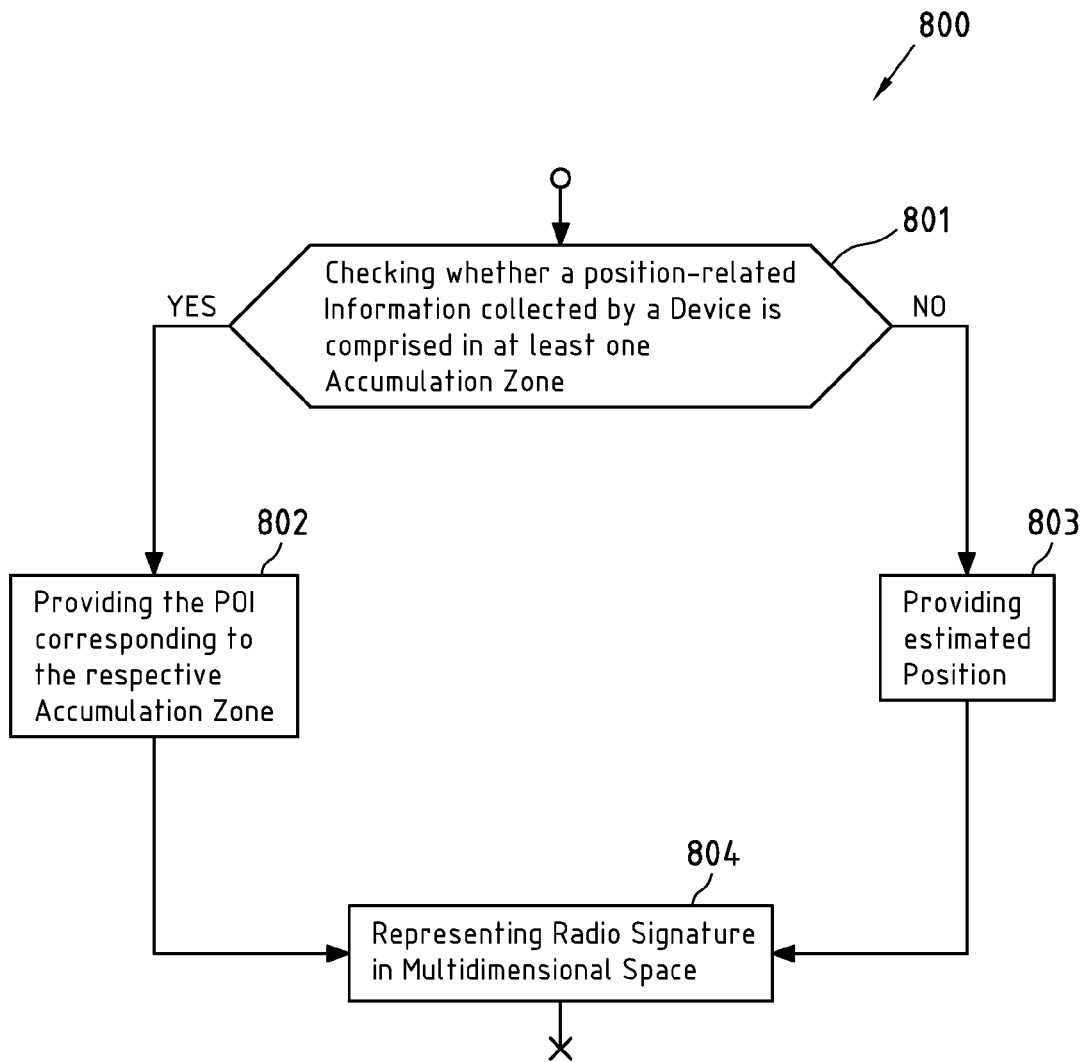
FIG. 8: a flowchart of a further example embodiment of a method according to the invention.

FIG. 8 shows a flowchart of a further example embodiment of a method according to the invention. This method may for instance be performed by device 2a of FIG. 1a, device 2b of FIG. 1b, or server 4c of FIG. 1c.

In a first step 801, it can be checked whether a position-related information which is collected by a device 2a, 2b or 2c in order to determine the actual position, namely the actual POI, is comprised in at least one accumulation zone. For instance, device 2a or 2b comprises a database with all or at least all data relevant for a specific region. More particularly, in the database, a plurality of accumulation zones or hull points sets corresponding to respective POIs can be stored. It may be also possible that the respective database is comprised and administered by the server 4c. In this case, the device 2c collects position-related data and may transmit it to server 4c.

Preferably, only if the checking yields to a positive result, a POI is provided. For instance, device 2c receives the POI corresponding to the previously collected position-related information (step 802). It shall be understood that the POI can be presented in different ways. By way of example, the POI can be provided by presenting a specific point location, if an identified POI has been mapped against an existing specific point location database.

If a POI cannot be determined, for instance, since no accumulation zone or hull points set stored in the database comprises the corresponding position-related information, an estimated position, for instance, by computing physical coordinates, can be provided (step 803). It may be also possible that merely a message is provided that a POI could not be determined or the like.

The newly collected position-related information can be added as a respective position-related point in the space (step 804). The database can thus be updated continuously.

Furthermore, it may be possible that device 2c collects position-related information in a first step and, in a next step, receives a POI corresponding to an accumulation zone, wherein the collected position-related information is comprised in the accumulation zone stored in a database, and wherein one or more of collected position-related information are represented as respective position-related points in a one- or multidimensional space.

Figure 9:
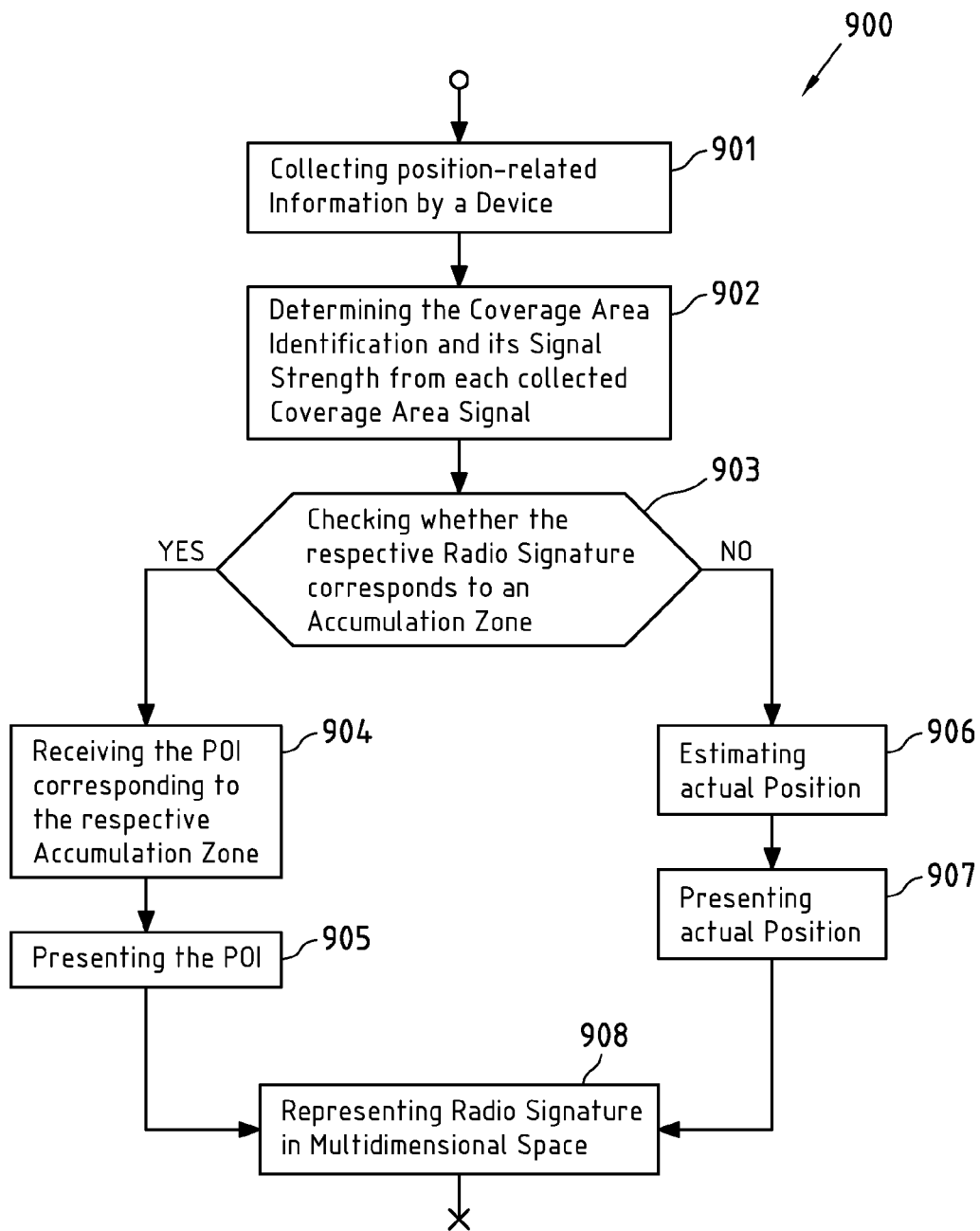
FIG. 9: a flowchart of a further example embodiment of a method according to the invention.

FIG. 9 is a flowchart 900 of a further example embodiment of a method according to the invention. This method may for instance be performed by device 2a of FIG. 1a, device 2b of FIG. 1b, device 2c of FIG. 1c.

For determining the actual physical position of a device 2a, 2b, or 2c, in particular, by presenting a respective POI directly, the device 2a, 2b or 2c may collect in a first step 901 position-related information. Preferably, the device 2a, 2b, or 2c for which a POI is to be determined may collect all coverage area signals which the device 2a, 2b, or 2c can "hear". A device 2a, 2b, or 2c may for instance be considered to "hear" a coverage providing entity if it is able to receive one or more signals (e.g. a broadcast channel), which are sent by the coverage providing entity, with a predefined minimum quality (for instance defined in terms of a signal-to-noise ratio or a signal-to-noise and interference ratio), or if the device is capable of at least partially receiving and correctly decoding one or more signals sent by the coverage providing entity (e.g. a broadcast channel), or if the device is able to receive and correctly decode a coverage providing entity identifier (for instance a Medium Access Control (MAC) address or another identifier).

Then, in a next step 902 from each collected coverage area signal the coverage area identification and its respective signal strength can be determined. In other words, a particular radio signature can be obtained. This step 902 can be performed by an apparatus comprised in the device 2a, 2b or 2c or by server 4b or 4c.

Furthermore, in next step 903, it can be checked whether the respective determined radio signature corresponds to an accumulation zone stored in a database. This can be done by the device 2a, 2b itself or the device 2c can transmit the radio signature to server 4c which may perform the respective task. For instance, it can be checked whether the received radio signature lies within a hull points set.

If an accumulation zone comprising the collected radio signature is detected, the corresponding POI can be received from the database in step 904. If server 4c detects the POI, it may transmit the result to the device 1c.

Afterwards, the respective POI can be presented for instance via a suitable interface (step 905). For instance, the POI can be presented via a display. Further additionally attributes associated with the POI which can be retrieved from the database can be presented, as well.

If the radio signature does not belong to an accumulation zone, thus, a POI cannot be determined, it may be possible to estimate the actual physical position of the device 2a, 2b or 2c using state of the art methods (step 906) (for instance by triangulation, or by forming an intersection). The result can be presented to the user in step 907, as previously described.

It shall be understood that according to other variants of the present invention, it may be also possible to present merely an error message, like "a POI could not be determined" or the like.

In step 908, the determined radio signature can be represented as a new position-related point in the multidimensional space. In other words, the database can be increased by storing each newly collected radio signature. Furthermore, accumulations zones can be periodically detected, thus, a suitable cluster algorithm can be applied to the position-related information points comprising also the newly collected position-related information points.

For instance, the accumulation zones may merge if more position-related information points are collected. If lots of position-related information points are recorded between two accumulation zones, it can be assumed that there is no separation between them and that they are actually only one accumulation zone.

Furthermore, POIs can also be stored in a hierarchical structure. For instance, by applying different thresholds in the clustering algorithm, different resolutions can be obtained for the accumulation zones. By way of example, if two accumulation zones merge because of new position-related points or because of a different threshold, the information can be retained by keeping the two smaller accumulation zones as sub-accumulation zones of the merged accumulation zone in the database.

Furthermore, the resolution of the clustering algorithm could be adapted to the total number of position-related points recorded. One option may be to pick the threshold a posteriori or to use a simple reasoning on the density evolution as the number of position-related points increase. For example, in a d-dimensional space, the distances may evolve like the number of position-related information points to the power $-1/d$, wherein d is to be taken equal to the average number of different coverage area identifications in the measurements.

Figure 10:
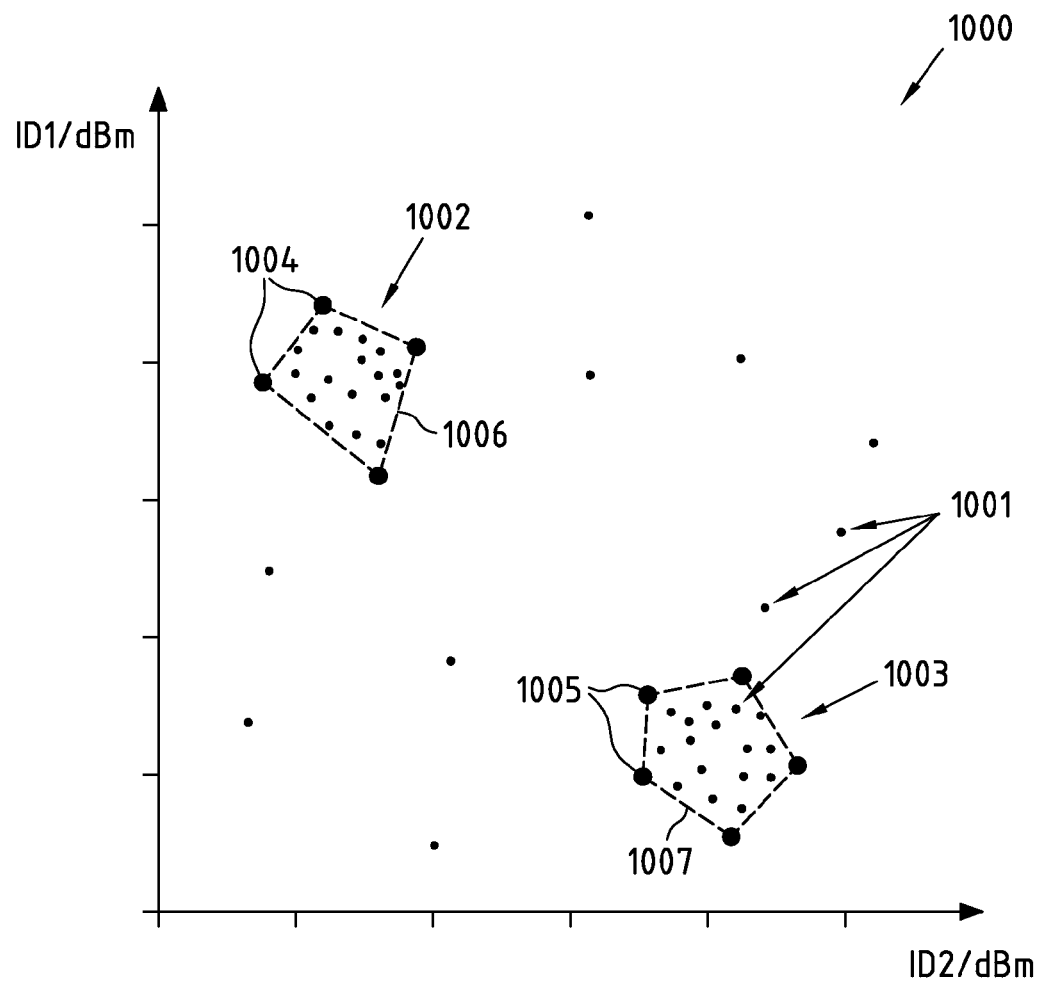
FIG. 10: an illustration of an exemplified two-dimensional space comprising a plurality of position-related information points.

FIG. 10 shows an illustration of an exemplified one- or multidimensional space 1000. For the sake of clarity, the depicted multidimensional space 900 comprises merely two dimensions ID1 and ID2. In practice, the multidimensional space 1000 may comprise a plurality of dimensions. In particular, the number of dimensions may depend on the number of possible coverage providing entities and their identifications. For example, the number of dimensions may be as large as the number of possible cell IDs, MAC addresses and satellites.

The coordinates of the depicted two-dimensional space may represent the signal strength of the respective coverage area signals in dBm. In the two-dimensional space, a plurality of position-related points 1001 are stored, wherein for sake of clarity, merely three are denoted.

As can be seen from FIG. 10, there are two accumulation zones 1002 and 1003. Furthermore, each accumulation zone comprises hull points 1004 or 1005. The hull points 1004 and 1005 are outer points, for instance, position-related points or additionally added points which form the outer boundary of the accumulation zones. More particularly, the hull points 1004, 1005 of each hull points set may define a complex hull which comprises preferably all position-related points of an accumulation zone. Also merely some of the hull points are denoted with the respective reference signs 1004 or 1005 for sake of clarity.

In the following, a possible example of an embodiment of the method according to the invention for a simple case (single user, Wifi only) will be described.

It is assumed that a user is located inside an office building which is equipped with Wifi. His/her mobile device may scan for Wifi access points periodically (e.g. every 5 minutes). The measurements (as examples of position-related information) reported by the device may look as follows:

| 1.8.2010, 10:00 | |
| --- | --- |
| 00:17:df:a8:26:0e | −68 dBm |
| 00:17:df:a8:0c:de | −60 dBm |
| 00:17:df:a8:0d:ce | −51 dBm |
| 00:17:df:a8:db:8e | −74 dBm |
| 00:17:df:a8:0d:c3 | −43 dBm |
| 00:1d:7e:43:9e:57 | −87 dBm |

| 1.8.2010, 10:05 | |
| --- | --- |
| 00:17:df:a8:26:0e | −68 dBm |
| 00:17:df:a8:0c:de | −66 dBm |
| 00:17:df:a8:0d:ce | −53 dBm |
| 00:17:df:a8:db:8e | −74 dBm |
| 00:17:df:a8:0d:c3 | −35 dBm |
| 00:17:df:a8:db:83 | −92 dBm |
| 00:1d:7e:43:9e:57 | −84 dBm |

| 1.8.2010, 10:10 | |
| --- | --- |
| 00:17:df:a8:26:0e | −70 dBm |
| 00:17:df:a8:0c:de | −61 dBm |
| 00:17:df:a8:0d:ce | −50 dBm |
| 00:17:df:a8:db:8e | −74 dBm |
| 00:17:df:a8:0d:c3 | −34 dBm |
| 00:1d:7e:43:9e:57 | −85 dBm |

| 1.8.2010, 10:15 | |
| --- | --- |
| 00:17:df:a8:26:0e | −70 dBm |
| 00:17:df:a8:0c:de | −66 dBm |
| 00:17:df:a8:0d:ce | −55 dBm |
| 00:17:df:a8:db:8e | −70 dBm |
| 00:17:df:a8:0d:c3 | −38 dBm |
| 00:1d:7e:43:9e:57 | −86 dBm | and so on. In other words, for each time point (10:00, 10:02, etc.) the coverage area identifications (MAC-addresses) and their respective signal strength (in dBm) are determined from the coverage area signals received by the device. As can be seen from the previous measurements, the determined parameters are approximately equal for each measurement.

However, while moving to another physical location, the device may report much more varying measurements, such as

| 1.8.2010, 10:20 | |
| --- | --- |
| 00:17:df:a8:26:0e | −59 dBm |
| 00:17:df:a8:0c:de | −48 dBm |
| 00:17:df:a8:0d:ce | −52 dBm |
| 00:17:df:a8:db:8e | −57 dBm |
| 00:17:df:a8:0d:c3 | −52 dBm |
| 00:1d:7e:43:9e:57 | −77 dBm |
| 00:17:df:a8:0d:c1 | −53 dBm |
| 00:18:39:bc:be:be | −90 dBm |
| 00:1f:1f:27:5b:e4 | −88 dBm |
| 00:16:b6:d9:2b:92 | −82 dBm |

| 1.8.2010, 10:25 | |
| --- | --- |
| 00:17:df:a8:26:0e | −47 dBm |
| 00:17:df:a8:0c:de | −59 dBm |
| 00:17:df:a8:0d:ce | −70 dBm |
| 00:17:df:a8:db:8e | −76 dBm |
| 00:17:df:a8:0d:c3 | −58 dBm |
| 00:1d:7e:43:9e:57 | −61 dBm |
| 00:16:b6:d9:2b:92 | −76 dBm |
| 00:25:c4:3c:cb:98 | −80 dBm |
| 00:17:df:a8:26:01 | −30 dBm |
| 00:17:df:a8:db:81 | −63 dBm |

The collected measurements (the position-related information) can be mapped as position-related points into a multidimensional space. In order to run the clustering algorithm on these measurements, a distance measure may be introduced between these reports. A possible option is to compute the average pair-wise absolute difference in dBm for each access point (absent access points are supposed to have signal strength below detection threshold, for example −96 dBm). Thus as a result of a distance measure between two time points, the following values for the two first reports (10:00 and 10:05) can be obtained:

| | 10:00 | 10:05 | absolute diff. |
| --- | --- | --- | --- |
| 00:17:df:a8:26:0e | −68 dBm | −68 dBm | 0 dBm |
| 00:17:df:a8:0c:de | −60 dBm | −66 dBm | 6 dBm |
| 00:17:df:a8:0d:ce | −51 dBm | −53 dBm | 2 dBm |
| 00:17:df:a8:db:8e | −74 dBm | −74 dBm | 0 dBm |
| 00:17:df:a8:db:83 | −96 dBm* | −92 dBm | 4 dBm |
| 00:17:df:a8:0d:c3 | −43 dBm | −35 dBm | 8 dBm |
| 00:1d:7e:43:9e:57 | −87 dBm | −84 dBm | 3 dBm |

*added default value for absence of the AP in the report.

The resulting distance between the two reports would be 3.29 dBm. In contrast, the distance between reports at 10:20 and 10:25 would be 20 dBm. In a similar way, the distances between all pairs of reports can be computed.

Density clustering algorithms such as DBSCAN may look for groups of close reports (in the sense of the distance measure introduced above) and assign them to the same accumulation zone. Reports which have not close neighbours can be considered as noise. Since reports made while the device is static are close and reports made while moving are scattered, the result of the algorithm may be that reports made while being static will be grouped together. In this example, the reports made at 10:00, 10:05, 10:10 and 10:15 will be grouped into one cluster, while the reports at 10:20 and 10:25 will be classified as noise.

The reports listed above can be seen as points in a vector space whose dimension is equal to the number of access points ever seen by the device. Therefore, the clusters identified by the algorithm can be seen as clouds of points in the respective space. The volume occupied by this cloud can be approximated by the convex hull of all the points belonging to the cluster. This convex hull may be entirely defined by the points on the corners of the hull, while position-related information points in the interior can be discarded. In the present example, none of the four points belong to the interior of the convex hull (this is due to the fact that the cluster has very few points; in a real scenario, accumulation zones would have many more points).

The next time that the user makes a Wifi scan, the device can immediately compare the Wifi report with the convex hulls stored in the database. If the position-related information point falls in the interior, the device knows that it has re-entered the POI associated with the accumulation zone.

As described hereinbefore, the physical location of mobile phones may be thought in terms of physical coordinates (i.e. longitude and latitude) on a map. However, the geographical representation may be unnatural for both location tracking technology and/or for the final applications.

On the tracking side, mobile units may be sensing radio signals, which are then converted (often with huge precision losses) into physical coordinates. On the application size, applications may not use such physical coordinates directly, but may instead convert them into "places" or "significant locations" (also called points of interest) that are more meaningful for the user than physical longitude and latitude coordinates.

Therefore, the translation of sensed signals into longitude and latitude may often be an unnecessary intermediate step.

Actually, skipping this step may even allow for greater accuracy in discriminating places. It may also allow for some amount of algorithmic simplification, which is very beneficial in power constrained devices, such as for instance mobile devices.

Exemplary embodiments of the present invention describe, as pointed out hereinbefore, a method for exploiting radio signals (for instance IEEE 802.11 beacons) directly to identify significant places and characterize them in terms of radio signature. Thus, the proposed method may take radio signals as an input and accomplishes the following tasks: Identifying significant locations from radio measurements collected by mobile devices over time and provide a compact representation of the significant locations that allows fast classification of further measurement (i.e. to tell whether a device is in a given location or not).

Furthermore, as previously described, the above methods can be implemented both on standalone devices (the device do their own measurement and location identification) and on networked devices. The second case has many advantages, such as faster and more accurate detection, and consistent locations across devices.

One or more devices may collect data on their radio environment (for instance cell tower IDs and signal strength, visible wireless access point MAC addresses and signal strength, list of satellites and signal strength, or possibly estimated GPS position) in a periodic manner. Each measurement (all signals present at on time point) can be obtained by a device or server and may be represented as a point in a multidimensional space.

After running the measurements for a while, a set of position-related points can be obtained in the big space to be clustered, as described hereinbefore.

As also previously described, once the clusters are identified, their extent in the high dimensional space can be characterized by a small subset of points that belong to the cluster, and whose convex hull comprises all (or almost all) the other points of the cluster. This subset of points, also called hull points set, may form the radio signature of the cluster. The clusters can be stored in some database. When a device is again located at one of the known POI, it can easily check whether its radio measurements fall in the convex hull of the radio-signature of one of the clusters, and can thus provide immediately if it is located in a known cluster.

Optionally, the new measurements can be added to the pool of past measurements so that the clustering of points can be revised periodically. Also, some older measurement can be discarded to permit slow adaptation to changes in the radio environment.

Furthermore, with respect to the distance measuring, a distance measure may be used which is most correlated with physical distances, so that accumulation zones are meaningful to the user (who lives in the physical world). It has been found by conducted experiments regarding this issue that the simple measure described works nearly as well as more complicated variants.

Nevertheless, better measures can be tested and tuned using the following experimental setup. The radio measurements can be done with two devices, moving one of them away from the other and recording the physical distance between them. Then the distance measure can be applied to their respective measurements. Afterwards, the calculated distance can be plotted as a function of the physical distance. The curve can be fitted with a linear function and the performance can be computed. These steps can be repeated in various places. The measure with the best fit may be the most desirable. Possible candidates could be of the form:

$$d = \frac{\sum_i |g(Rx(i, A)) - g(Rx(i, B))|}{f\left(\sum_i n\right)} \qquad (1)$$

wherein index i denotes all the signal sources receivable at device A and device B. Rx(i,A), Rx(i,B) denote the received signal strength of i at receiver A, B. The functions to be optimized are $$f\left(\sum_i n\right):$$

the scaling factor, simply n in the present example g( ): the distance function, log in the present example. One could replace it with an actual propagation model.

As previously described, the clusters might merge if more points are generated. This is a desired property of the system. If lots of position-related information points are recorded between two clusters, it can be assumed that there is no separation between them and that they are actually only one cluster.

However, the resolution of the clustering algorithm could be made dependent on the total number of position-related information points recorded. One option is to pick the threshold a posterior as described above, or to use a simple reasoning on the density evolution as the number of points increase Furthermore, it has been found that the signal strength variations caused by people or moving objects have a smaller magnitude than the proposed threshold of 10 dBm. Cluster fragmentation would only occur if the measurements would concentrate on two well-separated centroids. However, noise in the measurements may yield a uniformly spreaded continuum of measurements, which are nicely grouped together by the algorithm, even if the total spread of the cluster is much bigger than the threshold.

A main advantage of embodiments of the present invention is that it utilizes all the available positioning data (i.e. radio measurements of every kind) in their raw format, before any processing. This has the following beneficial consequences. There may be no loss of information due to pre-processing, and thus better resolution. The decision whether the device may be in a known cluster or not is algorithmically simple. The method may work very well without GPS measurement wherever there is WLAN.

As used in this application, the term 'circuitry' refers to all of the following:

(a) hardware-only circuit implementations (such as implementations in only analog and/or digital circuitry) and (b) combinations of circuits and software (and/or firmware), such as (as applicable):

(i) to a combination of processor(s) or (ii) to portions of processor (s)/software (including digital signal processor(s)), software, and memory(ies) that work together to cause an apparatus, such as a mobile phone or a positioning device, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

The invention claimed is:

1. An apparatus, comprising at least one processor, and at least one memory including computer program code, the at least one memory and the computer program code configured to, with the at least one processor, cause the apparatus at least to obtain respective position-related information collected by at least one device based on signals from a plurality of coverage providing entities having respective coverage area identifications at a plurality of time points;

represent one or more of the collected position-related information as respective position-related points in a multidimensional space, wherein each position-related point is defined by a signal parameter value and a respective coverage area identification, and wherein the multidimensional space is defined by dimensions representative of the coverage area identifications and the signal parameter values; and identify at least one point of interest by detecting at least one accumulation zone based on a density of the position-related points in the space.

2. The apparatus according to claim 1, wherein the apparatus is one of:

the device or a part thereof, or a server that is configured to obtain the position-related information from the device or a part of the server.

3. The apparatus according to claim 1, wherein collected position-related information comprises all receivable coverage area signals which exceed at least one signal threshold.

4. The apparatus according to claim 3, wherein the at least one memory and the computer program code are further configured to, with the at least one processor, cause the apparatus to:

determine at least one coverage area identification from at least one collected coverage area signal, determine at least one signal parameter value from at least one collected coverage area signal, and assign at least one coverage area identification to at least one dimension of the multidimensional space, wherein the dimension comprises a coordinate corresponding to the signal parameter value, and wherein at least one collected position-related point is represented in the space by storing the determined coverage area identification and the respective signal parameter value of at least one received coverage area signal as a position-related point in the space.

5. The apparatus according to claim 1, wherein detecting the accumulation zone comprises detecting at least one of:

whether a number of the position-related points within the accumulation zone exceeds at least one density threshold and whether a distance between at least two neighboured position-related points falls below at least one distance threshold.

6. The apparatus according to claim 5 wherein the distance comprises an average pair-wise absolute difference for a respective coverage providing entity at a respective time point.

7. The apparatus according to claim 5 wherein detecting the accumulation zone comprises detecting at least a minimum number of position-related points within the accumulation zone.

8. The apparatus according to claim 1, wherein detecting the accumulation zone comprises applying at least one density clustering algorithm to the position-related points.

9. The apparatus according to claim 1, wherein the at least one memory and the computer program code are further configured to, with the at least one processor, cause the apparatus to map at least one identified point of interest against at least one existing specific point location database.

10. The apparatus according to claim 1, wherein the at least one memory and the computer program code are further configured to, with the at least one processor, cause the apparatus to establish at least one hull points set, wherein hull points of the hull points set form an outer boundary of the accumulation zone.

11. The apparatus according to claim 10, wherein the at least one memory and the computer program code are further configured to, with the at least one processor, cause the apparatus to associate the at least one point of interest to at least one established hull points set, and to store at least the point of interest together with the associated hull points set in the database.

12. The apparatus according to claim 10, wherein the at least one memory and the computer program code are further configured to, with the at least one processor, cause the apparatus to receive position-related information collected by a device, and determine a point of interest corresponding to the received position-related information by checking whether the received position-related information is comprised in at least one accumulation zone stored in a database.

13. The apparatus according to claim 12 wherein the at least one memory and the computer program code are further configured to, with the at least one processor, cause the apparatus to store the hull points set without storing all other position-related points.

14. The apparatus according to claim 1, wherein the at least one memory and the computer program code are further configured to, with the at least one processor, cause the apparatus to associate further attributes to the at least one accumulation zone, wherein an attribute is at least one of:
   a) a semantic label, or
   b) a geographical location information.

15. The apparatus according to claim 1 wherein the at least one memory and the computer program code are further configured to, with the at least one processor, cause the apparatus to:
   receive position-related information represented by position-related points located in the multidimensional space at a location between at least to accumulation zones; and
   merge the at least two accumulation zones into a single accumulation zone.

16. An apparatus, comprising at least one processor, and at least one memory including computer program code, the at least one memory and the computer program code configured to, with the at least one processor, cause the apparatus at least to check whether a position-related point representing, in a multidimensional space, a position-related information collected by a device based on signals from a plurality of coverage providing entities having respective coverage area identifications is comprised in at least one accumulation zone corresponding to a point of interest stored in a database, the point of interest identified by detecting at least one accumulation zone based on a density of position-related points in the space, wherein each position-related point is defined by a signal parameter value and a respective coverage area identification, and wherein the multidimensional space is defined by dimensions representative of the coverage area identifications and the signal parameter values; and provide the point of interest corresponding to the accumulation zone, only if the checking yields a positive result.

17. The apparatus according to claim 16, wherein checking whether a position-related point representing, in the multidimensional space, a position-related information collected by a device is comprised in at least one accumulation zone comprises checking whether the position-related information is comprised in at least one hull points set defining the at least one accumulation zone.

18. An apparatus, comprising at least one processor, and at least one memory including computer program code, the at least one memory and the computer program code configured to, with the at least one processor, cause the apparatus at least to collect position-related information at a device based on signals from a plurality of coverage providing entities having respective coverage area identifications; transmit the position-related information from the device to a server; and receive, at the device, a point of interest corresponding to an accumulation zone from the server, the point of interest identified by detecting at least one accumulation zone based on a density of position-related points in a multidimensional space, the accumulation zone identified by the server to comprise a position-related point representing, in the multidimensional space, the collected position-related information, wherein each position-related point is defined by a signal parameter value and a respective coverage area identification, and wherein the multidimensional space is defined by dimensions representative of the coverage area identifications and the signal parameter values.

19. The apparatus according to claim 18, wherein collecting position-related information comprises collecting all receivable coverage area signals which exceed at least one signal threshold.

20. The apparatus according to claim 19, wherein the at least one memory and the computer program code are further configured to, with the at least one processor, cause the apparatus to
   determine at least one coverage area identification from at least one collected coverage area signal,
   determine at least one signal parameter value from at least one collected coverage area signal, and
   assign at least one coverage area identification to at least one dimension of the multidimensional space, wherein the dimension comprises a coordinate corresponding to the signal parameter value, and
   wherein at least one collected position-related point is represented in the space by storing the determined coverage area identification and the respective signal parameter value of at least one received coverage area signal as a position-related point in the space.

\* \* \* \* \*